Patented May 12, 1936

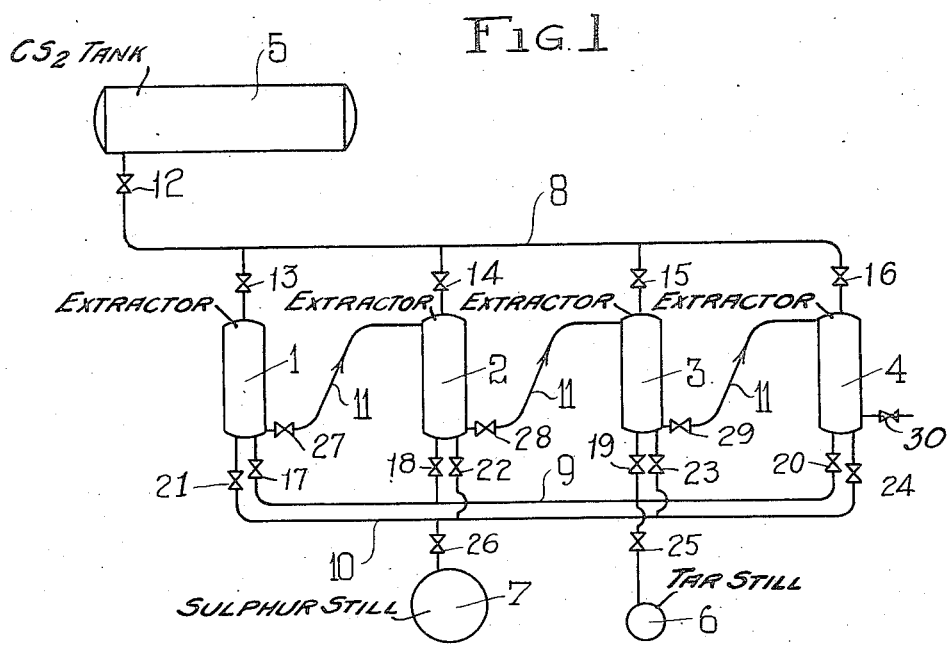
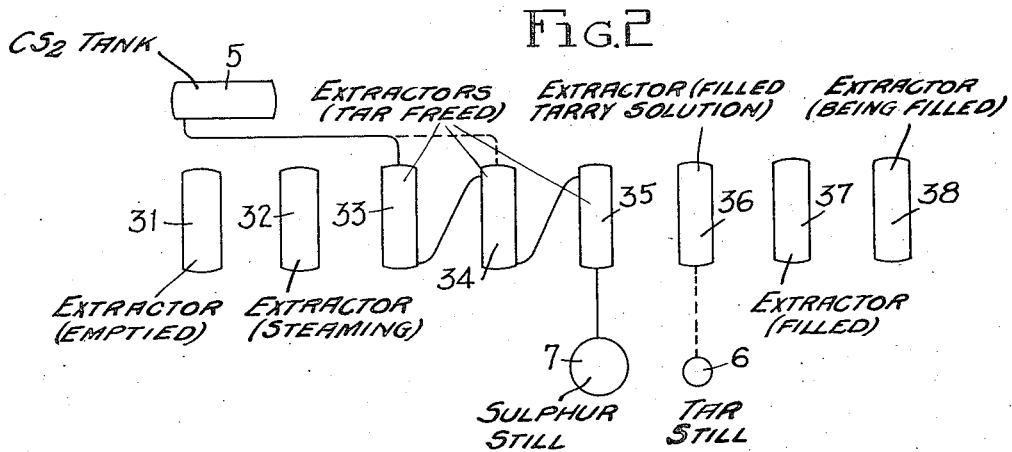

2,040,359

UNITED STATES PATENT OFFICE 2,040,359

PURIFICATION AND EXTRACTION OF SULPHUR BEARING MATERIAL

Robert Henry Clayton, Herbert Ernest Williams, and Hugh Burton Avery, Manchester, England, assignors to The Manchester Oxide Company, Limited, Manchester, England, a British company Application July 8, 1932, Serial No. 621,506
In Great Britain July 17, 1931

11 Claims. (Cl. 23—238)

This invention relates to the purification of sulphur bearing materials which contain extractable free sulphur and organic impurities of a tarry nature and the extraction of sulphur from such materials. Such sulphur bearing materials may be crude sulphur itself, or material containing sulphur such as spent oxide which has been used for the removal of sulphur from sulphur-bearing gases.

In the extraction of materials containing extractable free sulphur and organic impurities of a tarry nature, difficulty is experienced in eliminating such organic impurities which tend to contaminate the sulphur. Numerous proposals have been made for purifying crude sulphur with the object of removing tarry impurities. Such processes are generally only effective when the proportion of the impurities is relatively low. For example, when purifying crude sulphur by passing sulphur trioxide through the molten material and then filtering the pure sulphur from the insoluble residue, it has been found that if a high proportion of organic impurities be present the increased amount of insoluble residue on the filter retains an undue proportion of sulphur.

One object of the present invention is to provide an improved process by means of which the excessive amount of organic impurity is removed from the raw materials and the sulphur is immediately extracted in a purer form which is more amenable to final purification by the above mentioned process, by distillation, or by other known methods. Another object of the invention is to provide an improved process enabling sulphur of a reasonable degree of purity to be extracted from crude sulphur or other sulphur bearing materials by the aid of a solvent in the cold. A still further object is to provide a process in which the tarry matters are removed from raw materials containing extractable free sulphur by means of a saturated solution of sulphur in carbon bisulphide which is produced by extraction of sulphur from the raw materials themselves. A still further object is to provide a continuous process for the extraction of sulphur from successive portions of the raw material with continuous preliminary removal of the tarry matters by means of a portion of the solution of sulphur formed on extraction. These and other objects of the invention will be apparent from the following description and the appended claims.

We have observed that the tarry matter in general exists on the surface of the crystals or particles of the crude sulphur or sulphur bearing materials such as spent oxide and it is not diffused throughout the sulphur in the mass. A solution of sulphur in carbon bisulphide which may be saturated with sulphur is still capable of removing the tar, oil or other organic impurities usually associated with such raw materials and we are thereby enabled to effect substantial removal of the tarry matters in a preliminary operation and then extract sulphur in a purer form from the thus preliminarily treated material.

In carrying out the present invention the impure sulphur or sulphur bearing material is washed with a saturated solution of sulphur in carbon bisulphide formed in situ by treating a portion of the raw material with carbon bisulphide and thereafter employing this solution on a further quantity or successively on further quantities of the raw material contained, for example, in closed vessels with inlets and outlets for the solvent. A plurality of these vessels is connected in series, so that the countercurrent principle is employed whereby the carbon bisulphide flows successively through vessels containing material progressively richer in sulphur, and sulphur solution flows through vessels containing tarry matter until the quantity of tarry matter contained in such solution renders it necessary to remove it from the system.

In one method of working, several vessels are required some of which at any given time are in the extraction series, others in the washing series, while the remainder are being emptied or filled. Each vessel is provided at the top with an inlet for sulphur solution or carbon bisulphide and a connection from the bottom of the preceding vessel and at the bottom with a false bottom, an outlet for solution and a connection to the top of the next succeeding vessel. The inlets at the tops of the vessels may be provided with sprays or other devices to secure adequate distribution of the sulphur solution or carbon bisulphide through the contents of the vessel.

A preferred method of carrying out the invention will now be described in greater detail with reference to the accompanying diagrammatic drawing in which:

Figure 1 shows four vessels numbered 1 to 4 together with pipes and valves associated therewith, while Figure 2 shows a set of eight vessels numbered 31 to 38 similarly connected and similarly constructed, for the purpose of illustrating the cyclic character of the operations.

5 is a carbon bisulphide storage tank, 6 a still for the tarry solutions and 7 a still for the purified sulphur solutions. It will be obvious that if desired either of these stills or both of them may be duplicated to enable the operations to be carried out continuously while either or both of the stills may be opened for emptying. Valves 12 to 30 are provided where shown on Figure 1.

In this preferred form the saturated solution of sulphur in carbon bisulphide, which is employed for removing the tar, is produced in situ by feeding carbon bisulphide or a dilute solution of sulphur in carbon bisulphide on to the material in the extraction vessels. This carbon bisulphide or dilute solution of sulphur in carbon bisulphide takes up both sulphur and tar but rapidly becomes saturated with sulphur by contact with the first portions of the material to be washed whereafter it continues to remove tar alone. Moreover, in this preferred form the material from which the tar has been removed is treated, while still in the same vessel, for the extraction of the sulphur. When the extraction of the sulphur has proceeded so far that the solutions thereafter obtained are too dilute for economical recovery of sulphur therefrom, such dilute solution of sulphur in carbon bisulphide can be utilized for the purpose above indicated.

The flow of washing solution need only be slow, whereas the flow of extracted solution is rapid, so that very much more pure sulphur solution is produced than is required for use in the washing process.

A pipe line 8 is provided for the feed of carbon bisulphide to one or other of the extractors, a pipe line 9 for the removal of tarry solution and a pipe line 10 for the removal of sulphur solution. If the still 7 and still 6 are not required to be connected up to any of the extractors at the same time, it is possible to dispense with the pipe line 10 and connect the sulphur still to the pipe line 9. Valved pipes 11 are provided between adjacent extractors.

The crude sulphur to be purified is filled into the four vessels numbered one to four. Carbon bisulphide is run into No. 1 where it first dissolves sulphur and tar. This solution when saturated with sulphur will continue to remove tar. Thus as it runs from the bottom of No. 1 it is saturated with sulphur and contains a large quantity of tar. So long as the proportion of tar which it contains is too high to permit of passing it to the next vessel in the series the solution is run to the still 6. As soon as the tar content of the solution flowing from No. 1 falls to a valve permitting its use for further washing the solution is fed on to the top of No. 2.

In turn, the tarry solution from the bottom of No. 2 is run to the still 6 for a time until the tar content falls below the convenient limit. The weaker tarry solution now coming from No. 2 is then run in turn on to the top of No. 3 which is thus brought into the washing series and tarry solution removed from the bottom of No. 3 to the still 6 until its tar content in turn falls below the convenient limit, when the solution from No. 3 is fed on to the top of No. 4 and so on. Meanwhile, however, the solution is tested as it leaves No. 1. When sufficiently free from tar at this point, the solution is no longer run on to the material in No. 2 but is diverted to the still 7. During this operation the washing solution is allowed to stand in vessel 2 and any other vessel or vessels which may be in the washing series. When the concentration of sulphur in the solution flowing from No. 1 falls below the economical limit this solution instead of being fed to the still 7 is again fed to No. 2.

When the liquor flowing from No. 2 is in turn sufficiently free from tar it is likewise diverted to the still 7 and when the sulphur content of the liquor flowing from No. 1 shows that the material therein has been practically completely exhausted the feed of carbon bisulphide is transferred to No. 2. No. 1 is then drained, steamed, cleaned and re-filled.

There may be three or more vessels in each series at one time if required and there may be more vessels in the extracting series than in the washing series, if it is desired to allow more complete exhaustion with a rapid flow of carbon bisulphide.

Referring now to Figure 2 of the drawing, for convenience only those connections actually in use during the operations to be described are marked while those connections about to be used are shown in dotted lines. It will be understood that the connections shown in Figure 1 are available, e. g. the pipe lines 8, 9 and 10 and in particular the bottom of the vessel 38 may be connected to the top of the vessel 31. This arrangement will be described with reference to the removal of sulphur from spent oxide. At the time selected for illustration of the cycle of operations, the vessel 31 has just been emptied of extracted oxide, vessel 32 is being steamed for removal of residual adherent solvent, vessels 33, 34 and 35 are being extracted for sulphur, vessel 36 is lying filled with tarry solution, the greater part of the tarry material being concentrated in the lower half of the vessel, vessel 37 is filled with spent oxide ready for washing and vessel 38 is being filled. The carbon bisulphide fed to the top of vessel 33 flows through vessels 34 and 35 to the still 7. As soon as the sulphur solution flowing to the still 7 falls below the economical limit for sulphur recovery the valves are manipulated so that the solution flows from the vessel 35 to the vessel 36.

Tarry solution is then withdrawn from the bottom of vessel 36 and sent to the still 6. As soon as the proportion of tar in the solution flowing from the bottom of vessel 36 falls below the convenient limit the solution is fed from the bottom of vessel 36 to the top of the vessel 37 and tarry solution flowing from the bottom of the vessel 37 is fed to the still 6.

Meanwhile, however, the solution flowing from vessel 33 is tested and as soon as it is found that the sulphur has been practically completely extracted from the spent oxide contained therein, the solution is blown out, e. g. by steam, into the vessel 34 and the fresh carbon bisulphide fed into the top of the vessel 34. The vessel 33 can now be steamed, to remove traces of solvent, and emptied.

Meanwhile also the solution flowing from vessel 36 is tested and as soon as it is sufficiently free from tar it is fed to the still 7. While the solution is fed to the still 7, the vessel 37 is lying idle filled with tarry solution. In some cases it may happen that the next vessel 38 which by then has been filled, may have been brought into the washing series and in this case both the vessels 37 and 38 will be lying idle filled with tarry solution.

By continuing in this manner the vessels 38, 31, 32 and so on are successively brought into use.

It will be seen that in the operations described the solution is displaced from each vessel by the solution superposed upon it from the preceding vessel. The operations may be regarded as a succession of displacements rather than as a concession of displacements rather than as a continuous flow, the final displacement being effected by steam so as to leave the vessel empty of solvent.

For this purpose therefore it is sufficient merely to test the liquor flowing from the vessel 33 and allow solution to flow from the vessel 35 to the still 7 so long only as solution is being fed from vessel 33 to 34. Thus when the liquor in vessel 33 is to be displaced by steam, the vessel 35 is disconnected from the still 7 and connected to the vessel 36. The solution in vessel 35 is then displaced into vessel 36, in turn displacing a portion of the solution in vessel 36, which is more strongly tarry, into the still 6. The displacement into the vessel 37 of the solution from vessel 36 which contains too little tar to necessitate delivering it to the still 6 but too much tar to permit it to be delivered to the still 7 is continued until the vessel 37 is full. Any surplus carbon bisulphide which may remain in vessel 33 (which is of larger net liquid capacity than 37 owing to the removal of the sulphur) is dealt with in any convenient manner. Vessel 37 then stands idle while sulphur solution is withdrawn from the bottom of vessel 36 and delivered to the still 7 until such time as the vessel 34 is substantially freed of sulphur.

The material recovered in the still 6 contains the greater part of the tar which was originally contained in the spent oxide. It is in fact a form of sulphur heavily contaminated with tar, containing for example 14% or thereabouts of tar.

The invention is not, of course, limited to the specific modes of operation as described above.

We declare that what we claim is:—

1. Process for the removal of impurities and the extraction of sulphur from material containing extractible free sulphur and impurities of a tarry character, which consists in first causing a saturated solution of sulphur in carbon bisulphide, which contains too much tarry matter to render it suitable for recovery of sulphur therefrom but is still capable of taking up further tarry matter to flow through a body of said material until the greater part of the tarry matter has been removed therefrom, then causing an unsaturated solution of sulphur in carbon bisulphide substantially free from tarry matter to flow through said material from which the greater part of the tarry matter has been removed then causing successively more dilute solutions of sulphur in carbon bisulphide all of which dilute solutions are substantially free from tarry matter to flow through said material from which the greater part of the tarry matter has been removed, and recovering sulphur from some at least of said solutions substantially free from tarry matter after they have flowed through the said material from which the greater part of the tarry matter has been removed.

2. Process as claimed in claim 1 in which neat carbon bisulphide is finally caused to flow through said material from which the greater part of the tarry matter has been removed.

3. Process as claimed in claim 1 in which some at least of said saturated solution of sulphur in carbon bisulphide after flowing through said material is caused to flow through another body of material containing extractible free sulphur and impurities of a tarry character.

4. Process as claimed in claim 1 in which said saturated solution of sulphur in carbon bisulphide containing tarry matter is displaced downwardly by said unsaturated solution of sulphur in carbon bisulphide.

5. Process as claimed in claim 1 in which some at least of said saturated solution of sulphur in carbon bisulphide containing tarry matter after contact with said material is evaporated for the recovery of carbon bisulphide and tarry sulphur.

6. Process as claimed in claim 1 in which said more dilute solutions of sulphur in carbon bisulphide displace each other successively in a downward direction from contact with said material low in tarry matter.

7. Process for the extraction of a grade of sulphur low in tarry matter and of a grade of sulphur high in tarry matter from material containing extractible free sulphur but high in tarry matter which consists in first contacting said material high in tarry matter with so much of a saturated solution of sulphur in carbon bisulphide which contains too much tarry matter to render it suitable for recovery of sulphur therefrom but is still capable of taking up further tarry matter as to remove a major part of the tarry matter from said material high in tarry matter, displacing said saturated solution of sulphur in carbon bisulphide thereby enriched in tarry matter from contact with said material leaving said material low in tarry matter but substantially unchanged as to its sulphur content, treating a first portion of such displaced solution heavily contaminated with tarry matter for recovery of carbon bisulphide and of a grade of sulphur high in tarry matter, bringing a later portion of such displaced solution still capable of taking up tarry matter into contact with separate further materials high in tarry matter to be treated, contacting the said material low in tarry matter from which said solution has been displaced with an unsaturated solution of sulphur in carbon bisulphide thereby extracting a grade of sulphur low in tarry matter from said material low in tarry matter, and then contacting said material low in tarry matter successively with more dilute solutions of sulphur in carbon bisulphide all of which dilute solutions are substantially free from tarry matter.

8. Process as claimed in claim 7 in which said more dilute solutions of sulphur in carbon bisulphide displace each other successively in a downward direction from contact with said material low in tarry matter.

9. Process for the extraction of a grade of sulphur low in tarry matter and of a grade of sulphur high in tarry matter from material containing extractible free sulphur but high in tarry matter which consists in first contacting said material high in tarry matter with so much of a saturated solution of sulphur in carbon bisulphide which contains too much tarry matter to render it suitable for recovery of sulphur therefrom but is still capable of taking up further tarry matter as to remove a major part of the tarry matter from said material high in tarry matter, displacing said saturated solution of sulphur in carbon bisulphide thereby enriched in tarry matter from contact with said material leaving said material low in tarry matter but substantially unchanged as to its sulphur content, treating a first portion of such displaced solution heavily contaminated with tarry matter for recovery of carbon bisulphide and of a grade of sulphur high in tarry matter, bringing a later portion of such displaced solution still capable of taking up tarry matter into contact with separate further material high in tarry matter to be treated, contacting the said material low in tarry matter from which said solution has been displaced with an unsaturated solution of sulphur in carbon bisulphide thereby extracting a grade of sulphur low in tarry matter from said material low in tarry matter and then contacting said material low in tarry matter successively with more dilute solutions of sulphur in carbon bisulphide all of which dilute solutions are substantially free from tarry matter and finally contacting said material with neat carbon bisulphide.

10. Process for the removal of impurities and the extraction of sulphur from material containing extractible free sulphur and impurities of a tarry character which consists in confining a plurality of portions of said material in separate vessels and subjecting the portion of material in each vessel in succession to the following sequence of operations, namely, contacting said portion of material with so much of a saturated solution of sulphur in carbon bisulphide containing tarry matter in quantity sufficient to render said saturated solution unsuitable for recovery of sulphur therefrom by evaporation but insufficient to render it incapable of removing tarry matter from said portion of raw material as to cause said saturated solution to take up the major part of the tarry matter from said portion of raw material, displacing said saturated solution by means of an unsaturated solution of sulphur in carbon bisulphide substantially free from tarry matter thereby causing said unsaturated solution to take up sulphur from said portion of raw material, and thereafter continuing said displacement by means of solutions of sulphur in carbon bisulphide successively more dilute in sulphur and finally by means of neat carbon bisulphide until the free sulphur has been substantially entirely removed from said material.

11. Process as claimed in claim 10 in which a first portion of displaced solution whose content of tarry matter is too high to render the solution suitable for removal of tarry matter from raw material is evaporated for recovery of carbon bisulphide and tarry sulphur, a second portion of displaced solution whose content of tarry matter while insufficient to render said solution unsuitable for removal of tarry matter from raw material is too high to permit said solution to be evaporated for recovery of sulphur low in tarry matter is contacted with further material containing tarry matter, a third portion of displaced solution whose content of sulphur is sufficient to enable sulphur low in tarry matter to be recovered economically by evaporation is evaporated for recovery of carbon bisulphide and sulphur low in tarry matter, and the remaining displaced solution is contacted with further material from which tarry matter has been removed for the extraction of sulphur therefrom.

ROBERT HENRY CLAYTON.
HERBERT ERNEST WILLIAMS.
HUGH BURTON AVERY.